UNITED STATES PATENT OFFICE.

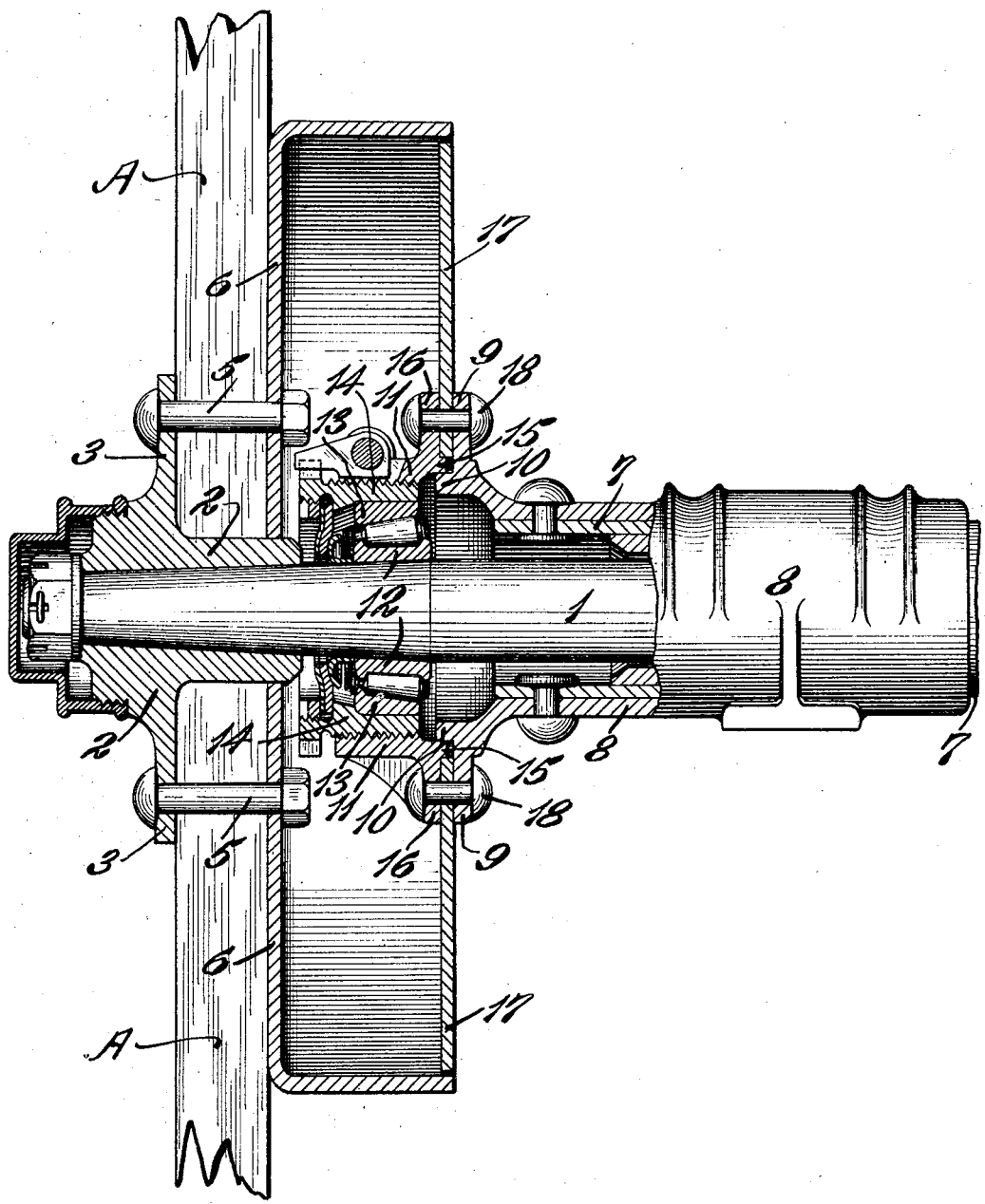

HERBERT VANDERBEEK, OF DETROIT, MICHIGAN, ASSIGNOR TO THE TIMKEN-DETROIT AXLE COMPANY, OF DETROIT, MICHIGAN, A CORPORATION OF OHIO.

AXLE CONSTRUCTION.

1,405,642.     Specification of Letters Patent.     Patented Feb. 7, 1922.

Application filed May 12, 1921. Serial No. 468,841.

*To all whom it may concern:*

Be it known that I, HERBERT VANDERBEEK, a citizen of the United States, and a resident of the city of Detroit, in the county of Wayne and State of Michigan, have invented a new and useful Improvement in Axle Construction, of which the following is a specification.

My invention relates to automobile axles and has for its principal objects to improve the end construction thereof. The invention consists in the parts and combinations of parts hereinafter described and claimed.

The drawing which forms part of this specification is a sectional view of an axle embodying my invention.

Secured to the end of a driving shaft 1 is a wheel-hub member 2 that is provided with an outwardly extending flange 3 near its outer end. The wheel spokes A bear endwise against the body portion of the hub member 2 and are clamped by bolts 5 between said flange 3 and a perforated disk or plate 6 that fits over the inner end of said hub. Preferably this plate is integral with the brake drum.

The shaft 1 is mounted in a hollow housing 7 on the end of which is riveted or otherwise secured a tubular extension or sleeve 8. This sleeve, which is preferably adapted to serve as a spring seat, is provided near its end with a circumferential flange 9, the end portion 10 of said sleeve projecting beyond the flange 9 to cooperate with a bearing support or mounting collar 11 as hereinafter described.

On the shaft 1 is mounted the cone or inner member 12 of a roller bearing, the outer bearing member 13 of which is fixed in the bore of an exteriorly threaded sleeve member 14. The thread of said member 14 works in a thread formed therefor in the inner surface of the outwardly projecting tubular portion of said bearing support or mounting collar 11. The hollow inner end 15 of said bearing support fits over the end portion of the sleeve or tubular extension 8 of the axle housing; and close to its said inner end, the bearing support has a circumferential flange 16 that is disposed parallel with and spaced from the circumferential flange 9 of the sleeve 8 of the housing.

Between the flange 9 of the housing extension and the flange 15 of the bearing support 11 is clamped the inner marginal portion of a perforated disk 17 that constitutes the support for the brake mechanism. Rivets 18 or the like pass through holes provided therefor in said flanges 9 and 16 and said brake supporting disk 17 and hold them securely together.

The construction above described is very strong and durable and can easily be adapted to various types of axles. In ordinary constructions, the axle sleeve and the support for the bearing are made in one piece which is provided with a circumferential flange to which the brake is secured. In the present construction, the brake disk is firmly clamped between two flanges which afford better support for the brake disk against buckling and tearing, and minimize the danger of the brake disk support being broken off. It is a great practical advantage that the construction is made of separate parts or sections, because conditions affecting the bearing are mainly independent of those that affect the axle housing extension and consequently the requirements of different designs of automobiles can be satisfied at less cost by such sectional construction.

What I claim is:

1. An axle construction comprising a hollow housing whose end portion has a circumferential flange, a bearing support whose end portion has a circumferential flange and a brake supporting disk clamped between said flanges.

2. An axle construction comprising a hollow housing having a circumferential flange near the end thereof, a bearing support having a circumferential flange near the end thereof, the end portion of said bearing support fitting over the end portion of said housing, and a brake supporting disk clamped between said flanges.

3. An axle construction comprising a hollow housing whose end portion has a circumferential flange, a bearing support whose end portion has a circumferential flange, said housing and bearing support being in axial alinement with their flanged ends adjoining and secured together and a brake supporting disk clamped between said flanges.

4. An axle construction comprising a hollow housing having a circumferential flange near but short of the end, a bearing support having a circumferential flange near but short of its inner end, the end portion of said collar fitting over the end portion of said extension and a perforated brake supporting disk fitting over the end of said collar and clamped between said flanges.

5. An axle construction comprising a hollow housing, a tubular extension mounted on the end thereof, said extension having a circumferential flange near but short of the end, a bearing support having a circumferential flange near but short of its inner end, the end portion of said collar fitting over the end portion of said extension and a perforated brake supporting disk fitting over the end of said collar and clamped between said flanges.

6. An axle construction comprising a hollow housing, a sleeve mounted on the end thereof, said sleeve having a circumferential flange near the end thereof, a bearing support having a circumferential flange near its end and a brake supporting disk clamped between said flanges.

7. An axle construction comprising a hollow housing, a tubular extension mounted on the end thereof and having a circumferential flange near the end thereof, a bearing support having a circumferential flange near but short of its inner end, and an annular brake supporting disk fitting over the inner end of said bearing support with its inner portion between said flanges, said flanges and brake supporting disk being riveted together.

8. In an automobile axle, a hollow housing, a shaft therein, said housing having a circumferential flange near but short of the end thereof, a roller bearing for said shaft, a mounting collar for said roller bearing having a circumferential flange, said housing and mounting collar being disposed end to end with the inner end of the collar fitting over the outer end of said extension, and a brake supporting disk held between said flanges.

9. In an automobile axle, a hollow housing, a tubular extension thereof, a shaft therein, said extension having a circumferential flange near but short of the end thereof, a roller bearing for said shaft, a mounting collar for said roller bearing having a circumferential flange, said extension and mounting collar being disposed end to end with the inner end of the collar fitting over the outer end of said extension, and a brake supporting disk held between said flanges.

Signed at Detroit, Michigan, this 9th day of May, 1921.

HERBERT VANDERBEEK.